2,904,844

PROCESS FOR EMBOSSING POLYVINYL ACETAL SHEETS

Henry Smithies, Wilmington, Del., assignor to E. I. du Pont de Nemours and Company, Wilmington, Del., a corporation of Delaware No Drawing. Application February 10, 1956
Serial No. 564,628

6 Claims. (Cl. 18—57)

This invention relates to a process for preparing polyvinyl acetal sheeting, and more particularly to a process for preparing polyvinyl acetal sheeting having a roughened surface, to be used in the preparation of safety glass.

In the manufacture of safety glass it has been customary heretofore to employ as an interlayer a polyvinyl acetal sheet material, the surface of which has been embossed or roughened by mechanical means. The embossing or roughening of the surface is necessary to avoid premature adherence of the interlayer sheet to the glass surface while the interlayer sheet is being positioned for the laminating operation. Such roughening of the surface is further required to avoid the formation of air pockets during lamination.

Heretofore the surface roughening effect has been achieved by passing the safety glass interlayer sheets through the nip of embossing rolls. This method is entirely satisfactory, except that it requires an additional processing step for the interlayer material which is difficult to handle because of its adhesive properties and relative softness. The embossing operation must furthermore be carefully controlled to avoid excessive stretching and straining of the sheets, which may result in shrinkage during the lamination procedure. Surface roughening has also been accomplished by chemical treatments of the polyvinyl acetal sheets, but all methods have in common the disadvantage of introducing an additional processing step in the fabrication of polyvinyl acetal sheeting.

It is an object of the present invention to provide safety glass interlayer having a reduced tendency to adhere prematurely. Another object is to prepare polyvinyl acetal sheeting having a controlled degree of roughness without the aid of an additional processing step. A further object is to uniformly roughen the surfaces of polyvinyl acetal sheeting during the extrusion of the sheet. Other objects will become apparent hereinafter.

The objects of the present invention are accomplished by extruding a plasticized polyvinyl acetal composition containing from 0.6 to 15% of water by weight of the plasticized resin and preferably containing from 0.6 to 5% of water by weight of the plasticized resin. It was found that the extrusion of polyvinyl acetal safety glass interpolymer in the presence of 0.6 to 15% of water results in the formation of a uniform surface roughness as the sheet emerges from the extrusion die. The surface roughness obtained by extruding polyvinyl acetal interlayer compositions in the presence of 0.6 to 15% of water is highly suitable to avoid the premature adherence of the interlayer sheet of the fabrication of safety glass. It was further found that the degree of surface roughness could be controlled within practical levels by the variation of the water content within the levels stated.

The surface roughness of a polyvinyl acetal sheet may be defined by the peak frequency which measures the number of peaks in a given direction and distance and the peak height. By measuring these quantities in various directions, the uniformity of the roughness can be determined. It was found that the peak height increases as the water content of the extrusion composition is increased, and that the peak frequency of the sheet surface decreases as the water content of the extrusion composition is increased. Thus larger and higher peaks are formed on the sheet as the water content is increased. It was established that at a water content below 0.6% the number of peaks was too high and the height too small to achieve an effective reduction of premature adherence of the polyvinyl acetal sheeting. Increasing the water content beyond 15% of the polyvinyl acetal composition decreases the uniformity of the roughness, weakens the strength of the resultant sheeting and increases the tendency to form air pockets during lamination. The preferred water content in the polyvinyl acetal melt ranges from 0.6 to 5%. Within this range highly suitable, uniform surface roughening is obtained which is adequate for all purposes. It is, however, possible to increase the water content to 15% and obtain a useful surface roughening effect, if it is desired to do so.

Various types of extrusion apparatus may be employed in carrying out the process of the present invention. In general, it is preferred to add an excess of water to the polyvinyl acetal composition and premix the polymer and water at an elevated temperature near the melt extrusion temperature in a mixer to which a vacuum can be applied. From this premixer the polymer can then be directly fed to the sheet extruder which may be of any conventional design. Thus, by controlling the vacuum and the temperature in the premixer, as well as in the extruder, the desired water content in the polymer is readily achieved. As in the extrusion of all thermo plastic resins the properties of sheets obtained from the extrusion of polyvinyl acetal resin, according to the present invention, will depend to a certain degree on such factors as the land length of the die, the width of the die slit, and the finish of the die surfaces. However, these factors are consonant with extrusion conditions established in the prior art for the melt extrusion of plasticized polyvinyl acetal sheeting and are therefore readily determined.

Various polyvinyl acetal resin compositions may be employed in the process of this invention. Such compositions have been extensively described in the art and numerous types are available. These compositions usually comprise a mixture of a polyvinyl acetal resin made from one or more aldehydes by reaction with polyvinyl alcohol and contain suitable plasticizing materials. One of the principal resins employed in the manufacture of safety glass is polyvinyl butyraldehyde acetal resin. Preferred plasticizers are triethylene glycol dihexoate, dibutyl cellosolve adipate, dibutyl sebacate. The quantity of plasticizer added may vary from 20 to 50% by weight of the resin. The surface roughness obtained at any one particular water concentration will vary to some extent with the particular resin composition employed, i.e., the acetal resin and the plasticizer. However, an optimum concentration will, in most instances, fall within the range of water concentrations disclosed.

The process of the present invention is further illustrated by the following examples:

Examples I to V

The polyvinyl acetal resin employed in the examples was polyvinyl butyral having the following constitution: ester content calculated as polyvinyl acetate 0.5%; hydroxyl content calculated as polyvinyl alcohol 19.0%; acetal content calculated as polyvinyl butyral 80.5%. A 7% slurry of the resin in water was prepared and 41% by weight of the resin of triethylene glycol dihexoate was added to the aqueous slurry. The mixture was agitated until the plasticizer had been absorbed by the resin. The water content of the slurry was then reduced to 15% by passing the slurry through a filtering system and an extruder which compressed the material and simultaneously heated the plasticized resin to a temperature of 100° C.–155° C. The plasticized resin containing excess water was then fed into a vacuum zone, wherein the water content was reduced to the water content of the melt desired in the extrusion of the polymer. The conditioned resin composition was then fed into a commercial extruder and extruded through a 6" sheet die. The slit opening of the die was approximately 20 mils and the land length of the die was 1/16". In the table below are listed the specific conditions employed in each example and the resulting surface roughness obtained as measured by peak frequency and peak height. These two measurements were made by running a stylus attached to a strain gage and a recorder over the extruded sheet in the machine direction and then in the transverse direction.

dry plasticized material directly as it is fed into the sheet extruder. The construction of the die used to produce the sheeting from the melt may be of varied construction, and is not a part of the present invention because such sheet dies are readily available and are quite well known. Various process steps subsequent to the extrusion of the sheeting may be carried out without significantaly affecting the surface roughness of the sheeting such as drying or powdering the sheeting.

The advantages gained by the process of the present invention are the combination of the extrusion and embossing of polyvinyl acetal sheets, thus eliminating the additional process step of embossing through calendering and like operations and the disadvantages attached to such operations. Other advantages include a more variable control which is readily adapted to various compositions and various degrees of surface roughness required.

| Example | Extrusion Conditions | | | | | | Results | | | |
|---|---|---|---|---|---|---|---|---|---|---|
| | Percent Water | Melt. Temp. in ° C. | Die Press, p.s.i. | Takeoff ft./min. | Sheet Width in Inches | Sheet Thickness in Mils | Peak Frequency Per Inch | | Peak Height in Mils | |
| | | | | | | | M.D. | T.D. | M.D. | T.D. |
| 1 | 0.57 | 165 | 460 | 12.2 | 4⅞ | 16.6 | 82 | 86 | 0.6 | 0.5 |
| 2 | 1.89 | 166 | 500 | 39.0 | 4⅞ | 18.2 | 72 | 80 | 0.85 | 0.7 |
| 3 | 2.55 | 165 | 470 | 39.0 | 4 15/16 | 17.2 | 64 | 70 | 0.8 | 0.8 |
| 4 | 3.93 | 164 | 325 | 14.0 | 4 13/16 | 18.4 | 53 | 67 | 0.8 | 0.9 |
| 5 | 5.14 | 165 | 290 | 14.0 | 4⅞ | 17.0 | 46 | 67 | 1.0 | 0.9 |

The polyvinyl butyral sheeting obtained from the extrusion described hereinabove was dried, powdered and rolled up on a mandrel. On taking the sheet off the mandrel, it did not stick to the roll. Parts of the dry unpowdered sheeting were placed on flat glass surfaces and moved around on the surface without prematurely adhering to the surface of the glass. Glass laminates prepared from the sheeting made under the above-described extrusion conditions were bubble free and were found to have a high degree of adhesion.

It was found that the best results were obtained at peak frequencies of 50 to 100 peaks per inch and peak heights of .2 to 1.0 mil. As shown by the results, the peak frequencies varied litle in the machine direction and the transverse direction of the extruded sheet indicating a uniform roughness pattern.

The above examples have illustrated the extrusion of polyvinyl acetal resin in the presence of 0.6 to 5% of water in the melt, whereby a uniform surface roughness is obtained which is highly suitable to prevent premature adherence of the polyvinyl acetal resin to itself and to glass surfaces. It has also been shown that it is possible to control the degree of surface roughness by varying the concentration of the water in the polyvinyl acetal melt.

It is to be understood that the embodiments illustrated in the foregoing example are illustrative only, and various modifications may occur to those skilled in the art. The addition of the water may be made to the

I claim:
1. A process for extruding polyvinyl acetal resin sheets having reduced premature adhesion which comprises extruding at a temperature above 164° C. and under a pressure of at least 290 p.s.i. a plasticized polyvinyl acetal resin containing from 0.6 to 15% by weight of the plasticized resin of water at the extrusion temperature of the polymer, whereby a uniformly surface roughened sheet is obtained.

2. The process set forth in claim 1 wherein the water content is from 0.6 to 5% by weight of the plasticized resin.

3. The process as set forth in claim 1 wherein the polyvinyl acetal resin is polyvinyl butyral.

4. The process as set forth in claim 3 wherein the polyvinyl butyral is plasticized with the triethylene glycol dihexoate.

5. The process as set forth in claim 3 wherein the polyvinyl butyral is plasticized with dibutyl cellosolve adipate.

6. The process as set forth in claim 3 wherein the polyvinyl butyral is plasticized with dibutyl sebacate.

References Cited in the file of this patent
UNITED STATES PATENTS

| 2,120,935 | Groff | June 14, 1938 |
| 2,528,200 | Weinberg | Oct. 31, 1950 |
| 2,797,443 | Carlson | July 2, 1957 |